(12) United States Patent
Ogle et al.

(10) Patent No.: US 11,678,146 B2
(45) Date of Patent: *Jun. 13, 2023

(54) GEOLOCATIONING SYSTEM, PERSONAL LOCATOR DEVICE, AND METHOD FOR USE OF SAME

(71) Applicant: Enseo, LLC, Plano, TX (US)

(72) Inventors: Vanessa Ogle, Fairview, TX (US);
William C. Fang, Plano, TX (US);
Thomas R. Miller, Plano, TX (US)

(73) Assignee: Enseo, LLC, Plano, TX (US)

(*) Notice: Subject to any disclaimer, the term of this patent is extended or adjusted under 35 U.S.C. 154(b) by 22 days.

This patent is subject to a terminal disclaimer.

(21) Appl. No.: 17/355,802

(22) Filed: Jun. 23, 2021

(65) Prior Publication Data

US 2021/0321224 A1 Oct. 14, 2021

Related U.S. Application Data

(63) Continuation of application No. 16/913,652, filed on Jun. 26, 2020, now Pat. No. 11,057,744.

(60) Provisional application No. 62/868,138, filed on Jun. 28, 2019.

(51) Int. Cl.
*H04W 4/029* (2018.01)
*H04W 4/33* (2018.01)
*H04W 76/14* (2018.01)

(52) U.S. Cl.
CPC ............ *H04W 4/029* (2018.02); *H04W 4/33* (2018.02); *H04W 76/14* (2018.02)

(58) Field of Classification Search
CPC ....... H04W 4/029; H04W 4/33; H04W 76/14; H04W 4/80; H04W 4/023
USPC .................................................. 455/456.1
See application file for complete search history.

(56) References Cited

U.S. PATENT DOCUMENTS

| | | | |
|---|---|---|---|
| 9,332,304 B2 | 5/2016 | Ogle et al. | |
| 9,344,757 B2 | 5/2016 | Ogle et al. | |
| 9,357,254 B2 | 5/2016 | Ogle et al. | |
| 9,654,826 B2 | 5/2017 | Ogle et al. | |
| 9,654,827 B2 | 5/2017 | Ogle et al. | |
| 9,712,872 B2 | 7/2017 | Ogle et al. | |
| 9,800,932 B2 | 10/2017 | Ogle et al. | |
| 9,832,490 B2 | 11/2017 | Ogle et al. | |

(Continued)

OTHER PUBLICATIONS

Fargas et al.; GPS-free Geolocation using LoRa in Low-Power WANs; 2017; IEEE; 6 pages (Year: 2017).

*Primary Examiner* — Hirdepal Singh
(74) *Attorney, Agent, or Firm* — Scott Griggs; Griggs Bergen LLP

(57) ABSTRACT

A geolocationing system, personal locator device, and method for providing awareness in a multi-space environment, such as a hospitality environment or educational environment, are presented. In one embodiment, a personal locator device includes a first operational mode that determines an estimated location of the personal locator device by communicating with a server via an array of gateway devices defining an area of coverage. The personal locator device also has a second operational mode that determines the estimated location of the personal locator device by communicating with a server via a proximate wireless-enabled interactive programmable device. The second operational mode may be utilized when the personal locator device is out of the area of coverage.

20 Claims, 5 Drawing Sheets

(56) References Cited

U.S. PATENT DOCUMENTS

| | | | |
|---|---|---|---|
| 10,091,534 B2 | 10/2018 | Ogle et al. | |
| 10,104,402 B2 | 10/2018 | Ogle et al. | |
| 10,142,662 B2 | 11/2018 | Ogle et al. | |
| 2011/0099575 A1 | 4/2011 | Woo et al. | |
| 2016/0165387 A1* | 6/2016 | Nhu | H04W 4/80 |
| | | | 455/41.1 |
| 2016/0277796 A1 | 9/2016 | Ogle et al. | |
| 2017/0251256 A1 | 8/2017 | Ogle et al. | |
| 2017/0318341 A1 | 11/2017 | Ogle et al. | |
| 2018/0077459 A1 | 3/2018 | Ogle et al. | |
| 2018/0103361 A1* | 4/2018 | Virhiä | G06Q 50/01 |
| 2019/0037248 A1 | 1/2019 | Ogle et al. | |
| 2019/0045229 A1 | 2/2019 | Ogle et al. | |
| 2019/0098340 A1 | 3/2019 | Ogle et al. | |
| 2019/0357010 A1 | 11/2019 | Ali | |
| 2019/0364386 A1* | 11/2019 | Kusens | H04L 41/0803 |
| 2020/0107164 A1 | 4/2020 | Lopatin | |
| 2020/0162840 A1 | 5/2020 | Lipman | |
| 2021/0356279 A1* | 11/2021 | Szigeti | G01C 21/3407 |

\* cited by examiner

GEOLOCATIONING SYSTEM, PERSONAL LOCATOR DEVICE, AND METHOD FOR USE OF SAME

PRIORITY STATEMENT & CROSS-REFERENCE TO RELATED APPLICATIONS

This application is a continuation of U.S. patent application Ser. No. 16/913,652, entitled "Geolocationing System, Personal Locator Device, and Method for Use of Same" and filed on Jun. 26, 2020, in the names of Vanessa Ogle, et al., now U.S. Pat. No. 11,057,744 issued on Jul. 6, 2021; which claims priority from U.S. Patent Application No. 62/868,138, entitled "Geolocationing System, Personal Locator Device, and Method for Use of Same" and filed on Jun. 28, 2019, in the name of William C. Fang; both of which are hereby incorporated by reference, in entirety, for all purposes.

TECHNICAL FIELD OF THE INVENTION

This invention relates, in general, to geolocationing and, in particular, to enhanced performance in systems and methods for providing awareness and safety in a multi-room environment such as a hospitality environment, educational environment, or the like.

BACKGROUND OF THE INVENTION

Without limiting the scope of the present invention, the background will be described in relation to employee safety in hospitality environments, as an example. Employees face increased personal security risks at work in multi-room environments such as hospitality environments, which include motels, hotels, and the like, for example. Such hospitality industry employees often work alone and range over large interior areas that may be divided into many small, closed spaces. As a result of limited existing security measures, there is a need for improved systems and methods of providing awareness and safety in hospitality environments.

SUMMARY OF THE INVENTION

It would be advantageous to achieve systems and methods for providing geolocationing in a multi-space environment such as a hospitality environment, educational environment, or the like that would improve upon existing limitations in functionality. It would be desirable to enable an electrical engineering-based and software solution that would provide enhanced awareness and safety in an easy-to-use platform in the hospitality lodging industry or in another environment. To better address one or more of these concerns, a geolocationing system, personal locator device, and method for providing awareness in a multi-space environment, such as a hospitality environment or educational environment, are presented.

In one embodiment, a personal locator device includes a first operational mode that determines an estimated location of the personal locator device by communicating with a server via an array of gateway devices defining an area of coverage. The personal locator device also has a second operational mode that determines the estimated location of the personal locator device by communicating with a server via a proximate wireless-enabled interactive programmable device. The second operational mode may be utilized when the personal locator device is out of the area of coverage. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1A:
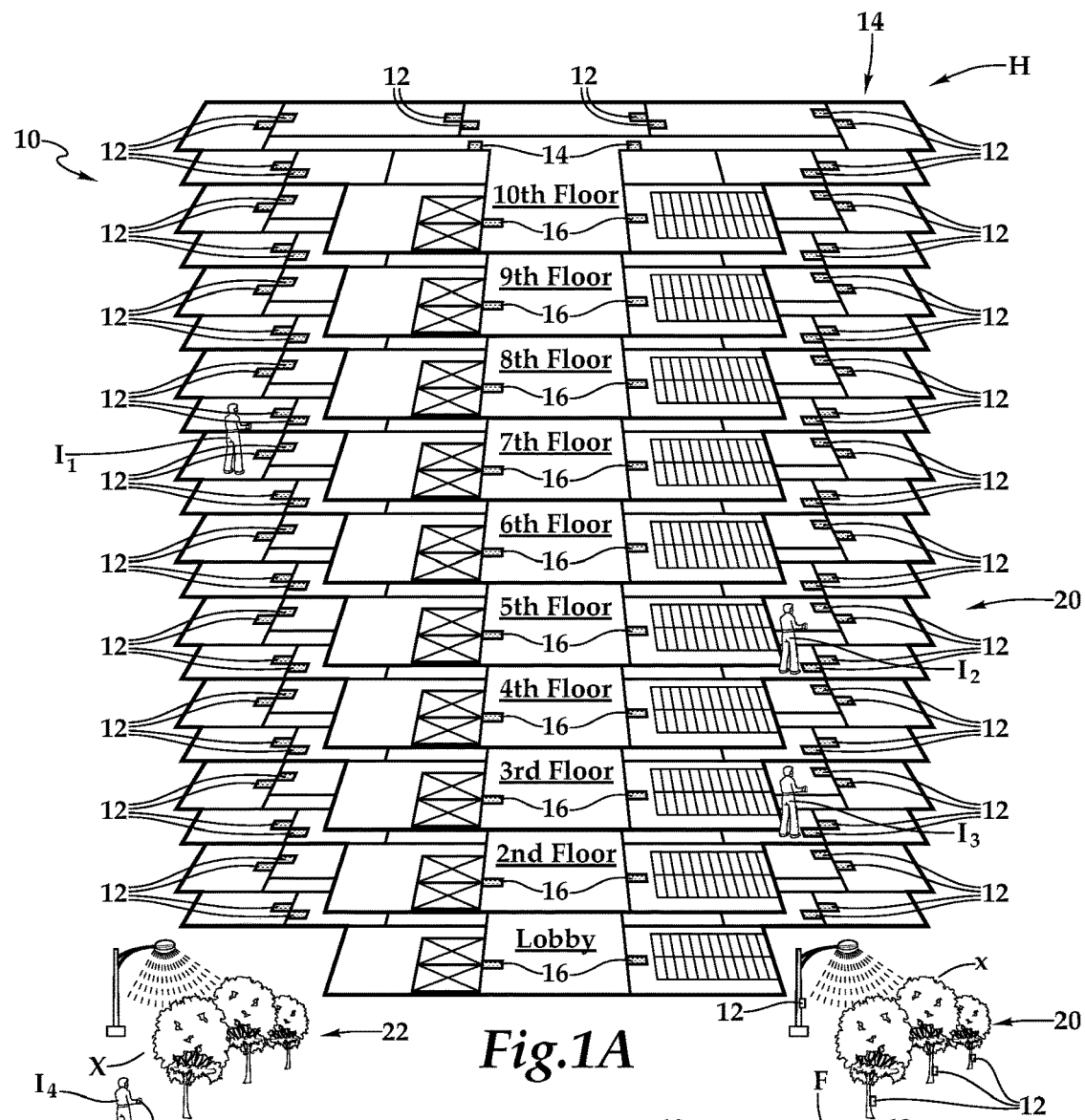
FIG. 1A is a schematic building diagram depicting one embodiment of a geolocationing system for providing awareness in a multi-room environment illustrated as a hotel, according to the teachings presented herein.
Figure 1B:
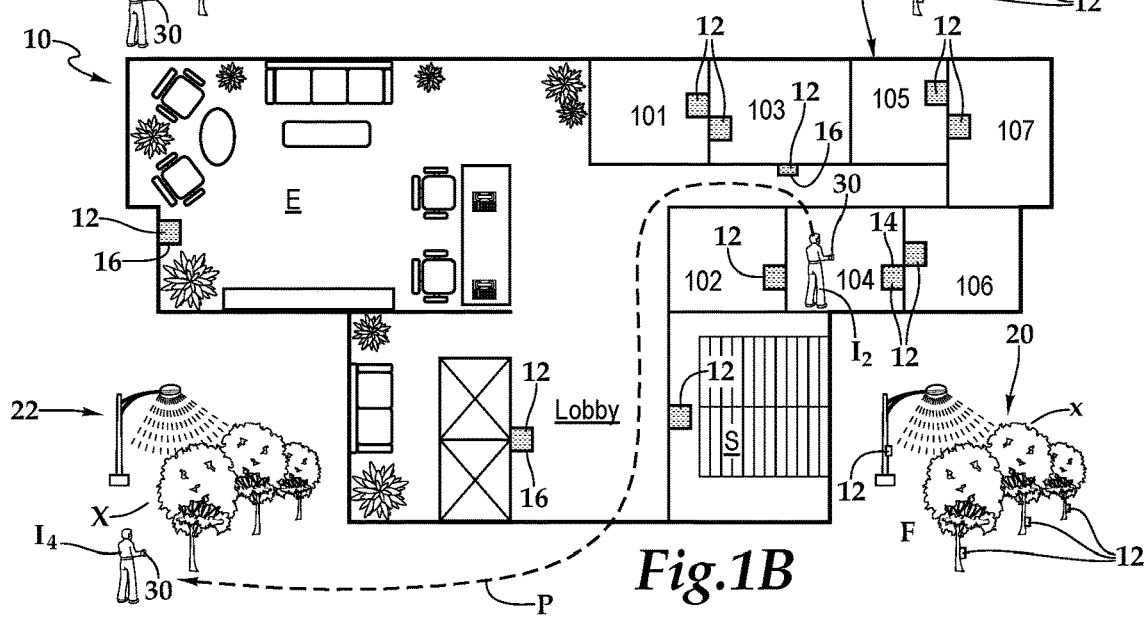
FIG. 1B is a schematic floor plan depicting a lobby and outdoor area of the hotel presented in FIG. 1A in further detail.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1A, FIG. 1B, FIG. 2A, and FIG. 2B, therein is depicted a geolocationing system for providing awareness in a multi-space environment such as a hospitality environment, which may be as a furnished multi-family residence, dormitory, lodging establishment, hotel, hospital, which is schematically illustrated and designated 10. The multi-space environment may also be a multi-unit environment such as an educational environment like a school or college campus, for example. More generally, the geolocationing system 10 and the teachings presented herein are applicable to any multi-space environment including hospitality environments, educational campuses, hospital campuses, office buildings, multi-unit dwellings, sport facilities and shopping malls, for example. It should be appreciated that the multi-space environment may include inside and outside spaces as well.

As shown, by way of example and not by way of limitation, the multi-space environment is depicted as a hotel H having a lobby and floors F, which are appropriately labeled the $2^{nd}$ floor through the $10^{th}$ floor. Additionally, a common seating area is labeled E and a stairwell, which a space S. The lobby, the common seating area E, and the stairwell, which is the space S, are further illustrations of spaces in the multi-space environment in addition to the rooms. Outside areas X are also further illustrations of spaces in the multi-space environment.

Gateway devices 12 are deployed as part of a horizontal and vertical array, which is generally a spatial array, throughout the hotel H. It should be appreciated, however, that the gateway devices 12 and more generally deployment of the geolocationing system 10 may include a horizontal array. Further, the deployment may be in a single story, multiple stories, or a combination thereof. As alluded previously, the deployment may include inside and outside spaces. As will be discussed in further detail hereinbelow, the gateway devices 12 may include set-top boxes 14 or gateway service devices 16. The gateway devices 12 define an area of coverage 20 and an area of non-coverage 22 that is outside of the area of coverage 20.

Individuals, such as $I_1$, $I_2$, $I_3$, $I_4$, carry personal locator devices 30 which periodically, or on demand, transmit beacons that are received by a gateway device 12 within the area of coverage 20 and then forwarded to a server 24. As shown, the personal locator devices 30 may be a single button personal locator device 32 having a housing 34 with a button 36. Within the area of coverage 20, the beacon may be communicated by a wireless standard, such as Wi-Fi 38, for example. Within the area of non-coverage 22, service is offered by the personal locator device 30 having a pairing 40 with a proximate wireless-enabled interactive programmable device 42 forwarding the signals to the server 24. The proximate wireless-enabled interactive programmable device 42 may be a smart watch, a smart phone, or a tablet computer, for example. In one embodiment, the proximate wireless-enabled interactive programmable device 42 may be a wireless-enabled smart and interactive handheld device that may be supplied or carried by the user or guest. Within the area of non-coverage 22, the beacon may be communicated by a wireless standard, such as cellular 44, for example.

As shown, individual $I_4$ works in the hospitality industry at hotel H and is working inside in room 104 before walking outside to an outside area X as shown by path P. The individual $I_4$ is carrying the personal locator device 30 and the proximate wireless-enabled interactive programmable device 42. As the individual $I_4$ is working in room 104 within the area of coverage 20, the personal locator device 30 is transmitting beacons that are received by the gateway devices 12 and forwarded to the server 24. As the individual $I_4$ walks outside to the outside area X, the personal locator device 30 is transmitting beacons that are received by the proximate wireless-enabled interactive programmable device 42 as the individual is within the area of non-coverage 22. The proximate wireless-enabled interactive programmable device 42 then sends gateway signals that are received by the server 24.

Figure 2A:
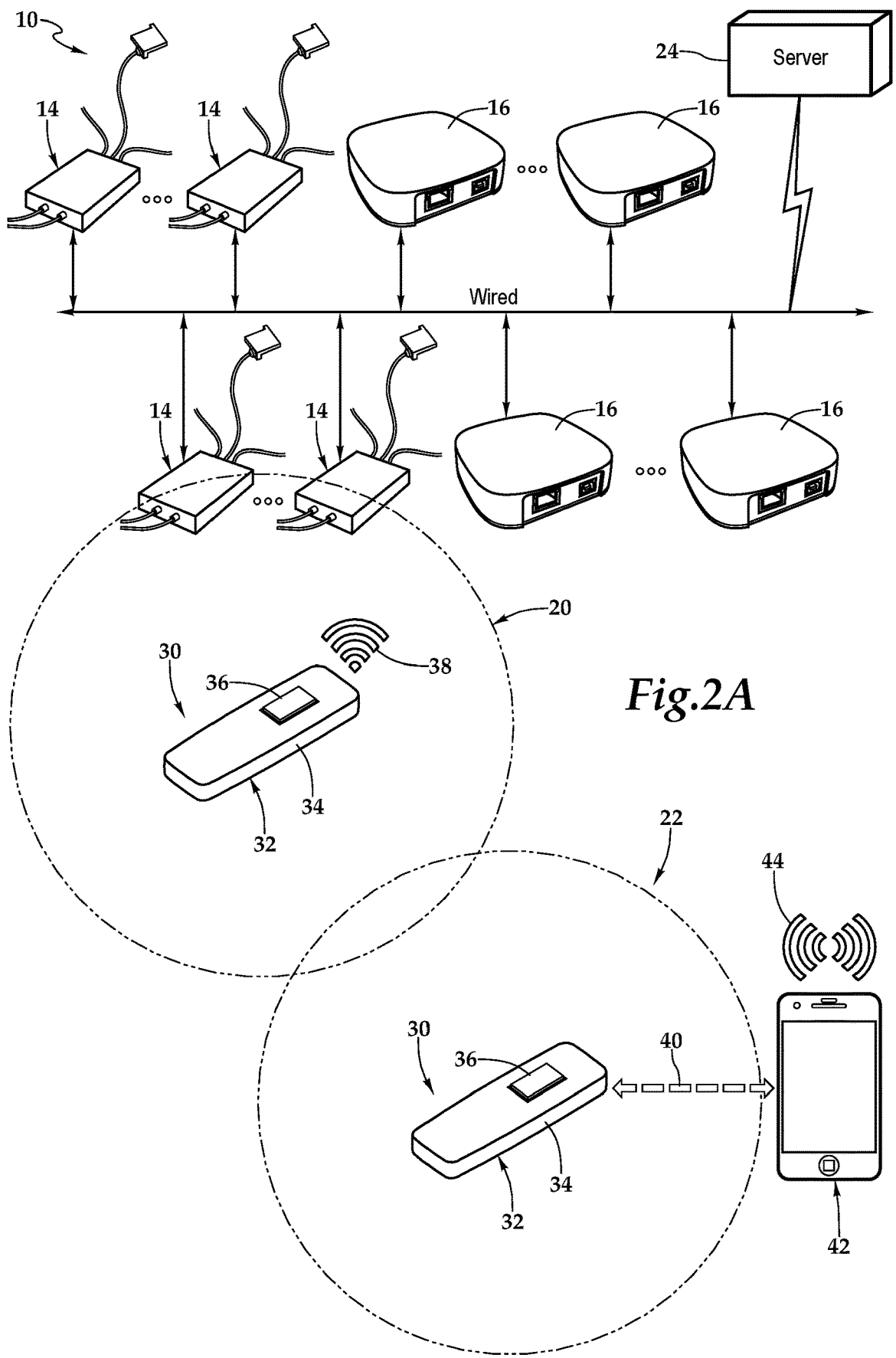
FIG. 2A is a schematic diagram depicting one embodiment of the geolocationing system presented in FIG. 1A at a topology level providing enhanced awareness and safety functionality therewith according to the teachings presented herein.
Figure 2B:
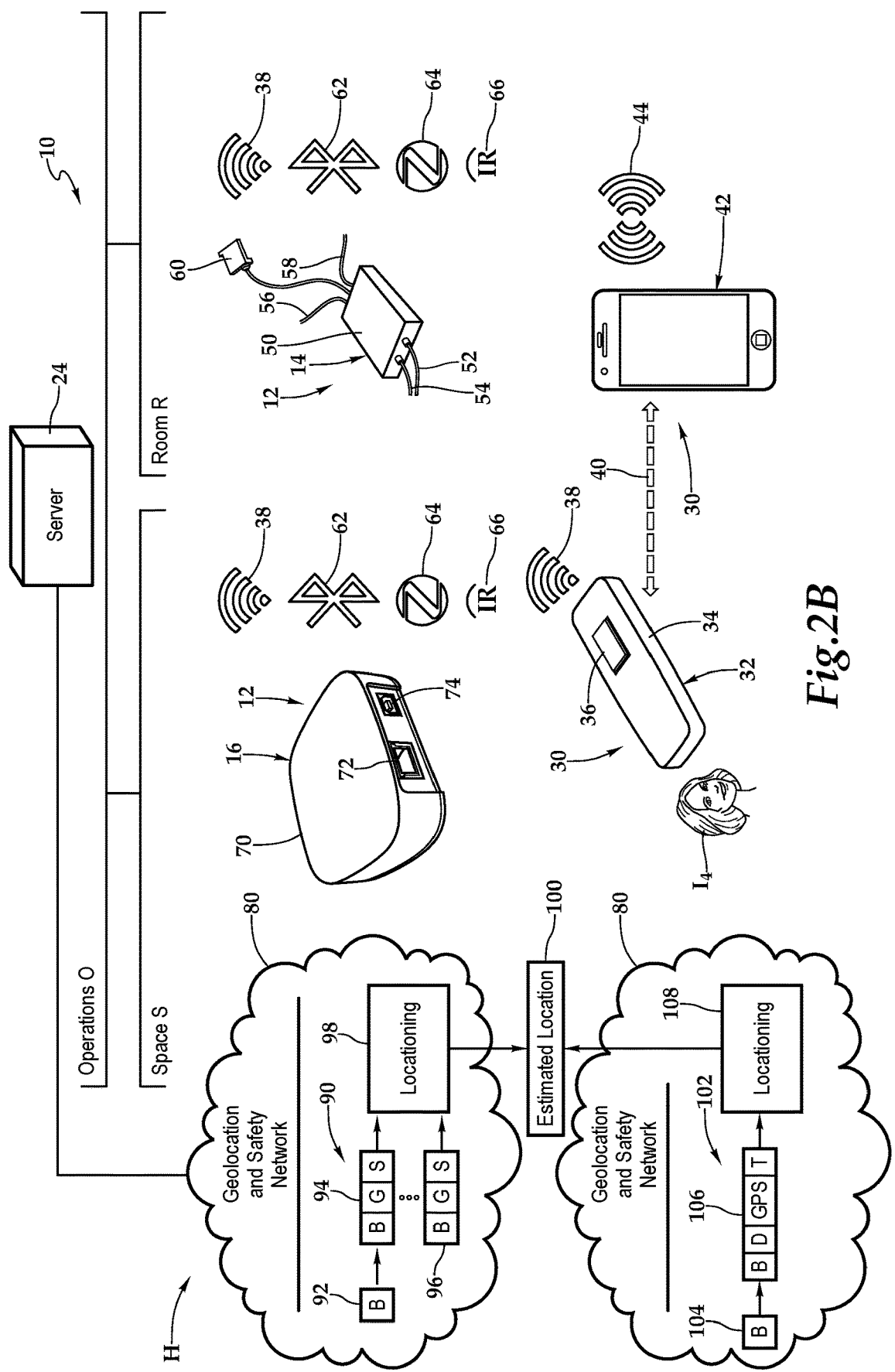
FIG. 2B is a schematic diagram depicting one embodiment of the geolocationing system presented in FIG. 1A at a network level providing enhanced awareness and safety functionality therewith according to the teachings presented herein.

As shown, the gateway device 12 in the room R is a set-top box 14, which may be connected to an electronic visual display device such as a display or television. The set-top box 14 includes a housing 50 and a connection, which is depicted as an HDMI connection 52, connects the set-top box 14 to the display (not shown). Other connections include a power cable 54 coupling the set-top box 14 to a power source, a coaxial cable 56 coupling the set-top box 14 to an external cable source, and a category five (Cat 5) cable 58 coupling the set-top box 14 to an external pay-per-view source, for example. As shown, the set-top box 14 may include a dongle 60 providing particular technology and functionality extensions thereto. That is, the set-top box 14 may be a set-top box-dongle combination in one embodiment. More generally, it should be appreciated that the cabling connected to the set-top box 14 will depend on the environment and application, and the cabling connections presented in FIG. 2B are depicted for illustrative purposes. Further, it should be appreciated that the positioning of the set-top box 14 will vary depending on environment and application and, with certain functionality, the set-top box 14 may be placed more discretely behind the display or as an in-wall mount. At least one antenna associated with the set-top box provides for the wireless capabilities of the gateway device 12 and include, for example, wireless standards: Wi-Fi 38, Bluetooth 62, ZigBee 64, infrared 66.

As mentioned, in one embodiment, the gateway device 12 in the space S of the area of coverage 20 is a gateway service device 16 having a housing 70 with physical connection ports 72, 74. A network cable which may be a category five (Cat 5) cable, may be secured to physical connection port 72. Multiple antennas provide for the wireless capabilities of the gateway device 12 and include, for example, wireless standards: Wi-Fi 38, Bluetooth 62, ZigBee 64, and IR 66. More generally, it should be appreciated that the cabling connected to the gateway device 12 and antenna configuration will depend on the environment and application and the cabling connections and wireless standards presented in FIG. 2B are depicted for illustrative purposes.

As shown, each of the gateway devices 12, including the set-top box 14 and the gateway service device 16 of FIG. 2B, have a data link to the server 24 which is providing a geolocation and safety network 80. In one implementation, an individual $I_4$ has the personal locator device 30, which may transmit a beacon from the personal locator device 30 using a wireless standard such as Wi-Fi 38 to the gateway devices 12. Each of the gateway devices 12, including the set-top box 14 and the gateway service device 16, then processes the received beacon signal and sends a gateway signal to the server 24. More particularly, with respect to data flow 90, the personal locator device 30, which is the single button personal locator 32, transmits the beacon signal 92 which includes a personal location device identification identifying the personal locator device 30. The beacon signal is received by each of the gateway devices 12 which transmit broadcast signals 94, 96 including the personal location device identification, a gateway device identification identifying the gateway device 12, and a signal characteristic indicator, such as signal strength, for example. The server 24 receives the broadcast signal 94 and uses multiple broadcast signals, including the broadcast signals 94, 96, for locationing 98, for determining the estimated location 100 of the personal locator device 30 of the individual $I_4$. The server 24, in turn, sends out the appropriate notifications to various phones, activates alarms, or notify others via a computer, depending on the situation. As a spatial array of horizontal and vertical gateway devices 12 are provided, the server 24 and system 10 presented herein is able to determine the location of the individual associated with the personal locator device 30 within a building. The estimated location 100 includes which floor the individual is presently located as well as the room or common area.

As will be appreciated, there are several methods for connecting vertical and horizontal array of gateway devices 12 to the server 24. Commonly used methods include Ethernet, Data Over Cable Service Interface Specification (DOCSIS), Multimedia over Coax (MoCa), and Wi-Fi. Frequently, however the desired coverage areas include non-network covered areas that lack the wired network or Wi-Fi connections, such as parking lots, parking garages, outdoor spaces, playgrounds, and ball fields, for example. Extending the network covered area to the non-network covered area is generally a costly option and it often involves substantial time. The teachings presented herein propose to utilize a proximate wireless-enabled interactive programmable device to extend system functionality to an area of non-coverage 22.

With respect to the area of non-coverage 22, as shown, the personal locator device 30 is not within range of the vertical and horizontal array of gateway devices 12, but the proximate wireless-enabled interactive programmable device 42 has a data link to the server 24 which is providing the geolocation and safety network 80. As mentioned, the individual $I_4$ has the personal locator device 30, which may transmit a beacon from the personal locator device 30 using a wireless standard via the pairing 40 to the proximate wireless-enabled interactive programmable device 42. As shown, the pairing 40 is previously established or substantially simultaneously established between the personal locator device 30 and the proximate wireless-enabled interactive programmable device 42. The proximate wireless-enabled interactive programmable device 42 then processes the received beacon signal and sends a gateway signal to the server 24. More particularly, with respect to data flow 102, the personal locator device 30, which may be the single button personal locator 32, transmits the beacon signal 104 which includes a personal location device identification identifying the personal locator device 30. The beacon signal 104 is received by the personal locator device 30, which transmits broadcast signal 106 including the personal location device identification, a gateway device identification identifying the proximate wireless-enabled interactive programmable device 42, and GPS coordinates, and a timestamp. The server 24 receives the broadcast signal 106 and uses the broadcast signal 106 for locationing 108, for determining the estimated location 100 of the personal locator device 30 of the individual $I_4$. The server 24, in turn, sends out the appropriate notifications to various phones, activates alarms, or notify others via a computer, depending on the situation.

In one implementation, the system 10 and the personal locator device 30 function to receive a beacon, such as an alert beacon message, append location and time stamps and forward the beacon message as a gateway signal to a server, such as a cloud server, for processing. In a typical application, the gateway device is a physical device deployed in nearly every room, hallway, lobby, and public area. The gateway device is programmed with its physical location and it is appending to the beacon message and uploading the message to the server. The coverage area in a hotel or school, for example, depends on the locations where the gateway devices are deployed. In one embodiment, the system and teachings presented here permit a proximate wireless-enabled interactive programmable device to act as a gateway that may follow the user to an area not covered by the gateway devices, such as a parking lot or other outdoor area, and use the proximate wireless-enabled interactive programmable device as the gateway to maintain contact with the server.

As described herein, in some embodiments, to start the proximate wireless-enabled interactive programmable device 42 and the personal locator device 30 may be paired via a wireless standard, such as Bluetooth 62. Then, depending on the mode of operation, the personal locator device 30 may use the proximate wireless-enabled interactive programmable device 42 to send out periodic status updates or send out an alter message in response to a "panic button" be activated on the personal locator device 30. In one implementation, the activation of the button on the personal locator device 30 causes the personal locator device 30 and the proximate wireless-enabled interactive programmable device 42 to enter into the gateway mode of operation where the proximate wireless-enabled interactive programmable device 42 receives and processes the beacons transmitted by the personal locator device 30.

Figure 3:
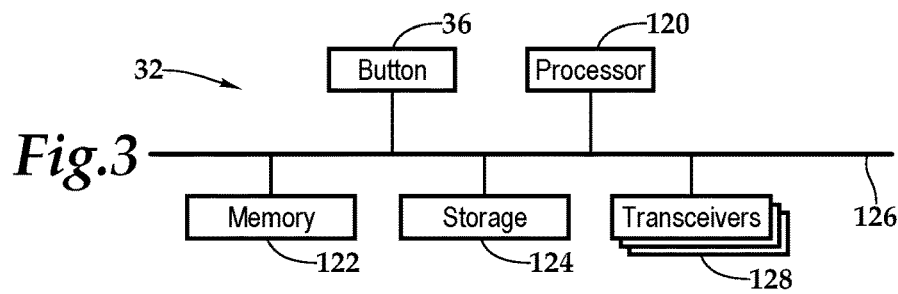
FIG. 3 is a functional block diagram depicting one embodiment of a personal locator device presented in FIG. 2B.

Referring to FIG. 3, the personal locator device 30 may be a single button personal locator device 32 that is an accessory generally containing convenience and safety functionality. The single button personal locator device 32 may include designs such as watches, bracelets, badges, pendants, and belt accessories, for example. Within the housing 34, a processor 120, memory 122, storage 124, and the button 36 are interconnected by a bus architecture 126 within a mounting architecture. The processor 120 may process instructions for execution within the computing device, including instructions stored in the memory 122 or in storage 124. The memory 122 stores information within the single button personal locator device 32 depicted as a computing device. In one implementation, the memory 122 is a volatile memory unit or units. In another implementation, the memory 122 is a non-volatile memory unit or units. Storage 124 provides capacity that is capable of providing mass storage for the single button personal locator device 32.

One or more transceivers 128 are associated with the gateway device 12 and communicatively disposed with the bus 126. As shown the one or more transceivers 128 may be internal, external, or a combination thereof to the housing. Further, the transceivers 128 may be a transmitter/receiver, receiver, or an antenna for example. Communication between the gateway devices 12 or the proximate wireless-enabled interactive programmable device 42 may be enabled by a variety of wireless methodologies employed by the one or more transceivers 128, including 802.11, 802.15, 802.15.4, 3G, 4G, Edge, Wi-Fi, ZigBee, near field communications (NFC), Bluetooth low energy and Bluetooth, for example. Also, infrared (IR) may be utilized. It should be appreciated that although a particular architecture is explained, other designs and layouts are within the teachings presented herein.

The memory 122 and storage 124 are accessible to the processor 120 and include processor-executable instructions that, when executed, cause the processor 120 to execute a series of operations. With respect to the processor-executable instructions, the processor 120 is caused to periodically transmit a beacon signal including a personal location device identification. With respect to another embodiment of the processor-executable instructions, the processor 120 is caused to transmit an alert beacon signal including a personal location device identification in response to detecting the activation of the button 36. With respect to still another embodiment of the processor-executable instructions, the processor 120 is caused to pair with a proximate wireless-enabled interactive programmable device 42.

Figure 4:
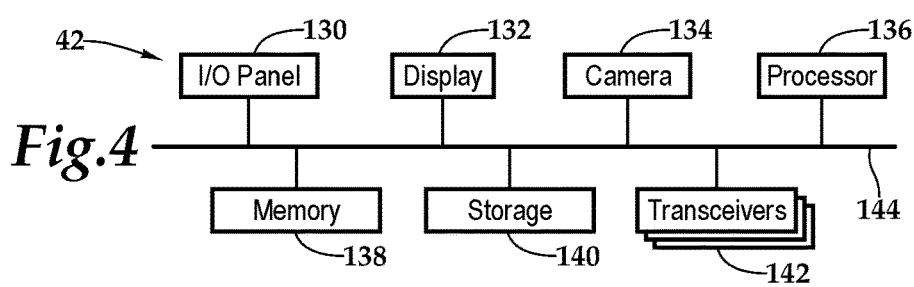
FIG. 4 is a functional block diagram depicting one embodiment of a smart device presented in FIG. 2B.

Referring to FIG. 4, the proximate wireless-enabled interactive programmable device 42 may be a wireless communication device of the type including various fixed, mobile, and/or portable devices. To expand rather the limit the previous discussion of the proximate wireless-enabled interactive programmable device 42, such devices may include, but are not limited to, cellular or mobile telephones, two-way radios, personal digital assistants, digital music players, Global Position System units, smart device and so forth. The proximate wireless-enabled interactive programmable device 42 may be a smart watch, smart phone, or tablet computer, for example. The proximate wireless-enabled interactive programmable device 42 may include an I/O panel 130, a display 132, a camera 134, a processor 136, memory 138, storage 140, and transceivers 142 interconnected by a bus 144. It should be appreciated that although a particular architecture is explained, other designs and layouts are within the teachings presented herein.

In operation, the teachings presented herein permit a proximate wireless-enabled interactive programmable device 42 such as a smart phone, tablet or laptop to be utilized as a gateway device to interactively communicate with a server in a geolocation and safety network in a multi-space environment. The memory 138 and storage 140 are accessible to the processor 136 and include processor-executable instructions that, when executed, cause the processor 136 to execute a series of operations. With respect to the processor-executable instructions, the processor 136 is caused to pair with a personal locator device 30. The processor 136 is then caused by processor-executable instructions to receive a beacon signal, including the possibility of an alert beacon signal, from the personal locator device 30, which includes a personal locator device identification. The processor 136 then appends a gateway device identification identifying the proximate wireless-enabled interactive programmable device 42, and GPS coordinates, and a timestamp to the beacon signal. The processor 136 is then caused to transmit a gateway signal to the server 24.

Figure 5:
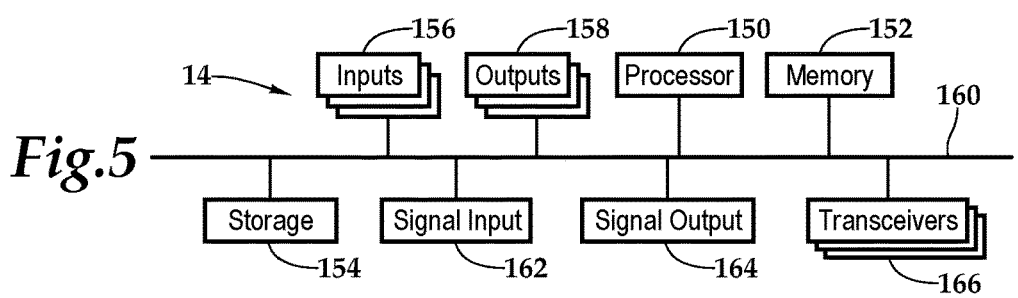
FIG. 5 is a functional block diagram depicting one embodiment of a gateway device presented in FIG. 2B.

Referring to FIG. 5, the gateway device 12 may be the set-top box 14. As used herein, set-top boxes, back boxes and set-top/back boxes may be discussed as set-top boxes. By way of example, the set-top box 14 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

Within the housing 50, a processor 150, memory 152, storage 154, the inputs 156, and the outputs 158 are interconnected by a bus architecture 160 within a mounting architecture. It should be understood that the processor 150, the memory 152, the storage 154, the inputs 156, and the outputs 158 may be entirely contained within the housing 50 or the housing-dongle combination. The processor 150 may process instructions for execution within the computing device, including instructions stored in the memory 152 or in storage 154. The memory 152 stores information within the computing device. In one implementation, the memory 152 is a volatile memory unit or units. In another implementation, the memory 152 is a non-volatile memory unit or units. Storage 154 provides capacity that is capable of providing mass storage for the set-top box 14. Various inputs 156 and outputs 158 provide connections to and from the computing device, wherein the inputs 156 are the signals or data received by the set-top box 14, and the outputs 158 are the signals or data sent from the set-top box 14. A television content signal input 162 and a television signal output 164 are also secured in the housing 50 in order to receive content from a source and forward the content, including external content such as cable and satellite and pay-per-view (PPV) programing, to the display.

One or more transceivers 166 are associated with the set-top box 14 and communicatively disposed with the bus 160. As shown the transceivers 166 may be internal, external, or a combination thereof to the housing 50. Further, the transceivers 166 may be a transmitter/receiver, receiver, or an antenna for example. Communication between various devices, including the personal locator device 30, and the set-top box 14 may be enabled by a variety of wireless methodologies employed by the transceivers 166, including 802.11, 3G, 4G, Edge, WiFi, ZigBee, near field communications (NFC), Bluetooth low energy and Bluetooth, for example. Also, infrared (IR) may be utilized. It should be appreciated that although a particular architecture is explained, other designs and layouts are within the teachings presented herein.

The memory 152 and storage 154 are accessible to the processor 150 and include processor-executable instructions that, when executed, cause the processor 150 to execute a series of operations. With respect to the processor-executable instructions, the processor 150 is caused to receive and process a beacon signal including a personal location device identification. More particularly, the processor-executable instructions cause the processor 150 to receive a beacon signal via the wireless transceiver from a proximate wireless-enabled personal locator device 42. The processor-executable instructions then cause the processor 150 to measure a received signal characteristic, such as signal strength, for example, of the beacon signal. The instructions may then cause the processor 150 to generate a gateway signal including the personal location device identification, a gateway device identification, and signal characteristics indicator, such as received signal strength. Finally, the instructions may cause the processor 150 to send the gateway signal to the server 24.

Figure 6:
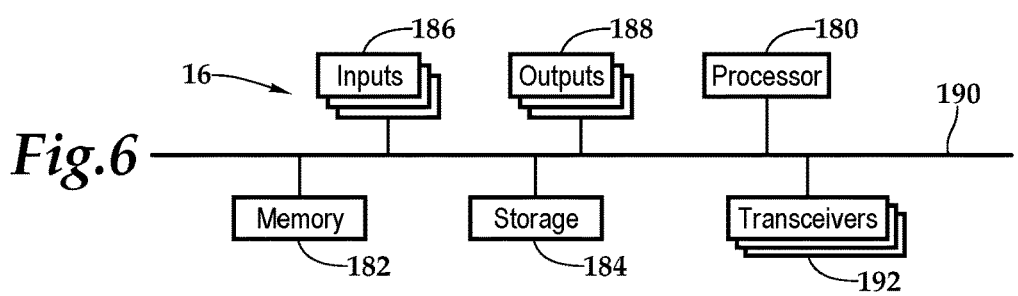
FIG. 6 is a functional block diagram depicting one embodiment of a set-top box presented in FIG. 2B.

Referring to FIG. 6, the gateway device 12 may be a set-top unit, such as the gateway service device 16, that is an information appliance device that does not include television-tuner functionality and generally contains convenience and safety functionality. Within the housing 70, a processor 180, memory 182, storage 184, inputs 186, and outputs 188 are interconnected by a bus architecture 190 within a mounting architecture. The processor 180 may process instructions for execution within the computing device, including instructions stored in the memory 182 or in storage 182. The memory 182 stores information within the computing device. In one implementation, the memory 182 is a volatile memory unit or units. In another implementation, the memory 182 is a non-volatile memory unit or units. Storage 184 provides capacity that is capable of providing mass storage for the gateway service device 16. The various inputs 186 and outputs 188 provide connections to and from the computing device, wherein the inputs 186 are the signals or data received by the gateway service device 16, and the outputs 188 are the signals or data sent from the gateway service device 16.

Multiple transceivers 192 are associated with the gateway service device 16 and communicatively disposed with the bus 190. As shown, the transceivers 192 may be internal, external, or a combination thereof to the housing. Further, the transceivers 192 may be a transmitter/receiver, receiver, or an antenna for example. Communication between the personal locator device 30 and the gateway service device 12 may be enabled by a variety of wireless methodologies employed by the transceivers 114, including 802.11, 802.15, 802.15.4, 3G, 4G, Edge, Wi-Fi, ZigBee, near field communications (NFC), Bluetooth low energy and Bluetooth, for example. Also, infrared (IR) may be utilized. It should be appreciated that although a particular architecture is explained, other designs and layouts are within the teachings presented herein.

The memory 182 and storage 184 are accessible to the processor 180 and include processor-executable instructions that, when executed, cause the processor 180 to execute a series of operations. With respect to the processor-executable instructions, the processor 180 is caused to receive and process a beacon signal including a personal location device identification. More particularly, the processor-executable instructions cause the processor 180 to receive a beacon signal via the wireless transceiver from a personal locator device. The processor-executable instructions then cause the processor 180 to measure a signal characteristic of the beacon signal. The instructions may then cause the processor 180 to generate a gateway signal including the personal location device identification, a gateway device identification, and signal characteristics indicator, including received signal strength, for example. Finally, the instructions may cause the processor 180 to send the gateway signal to the server 24.

Figure 7:
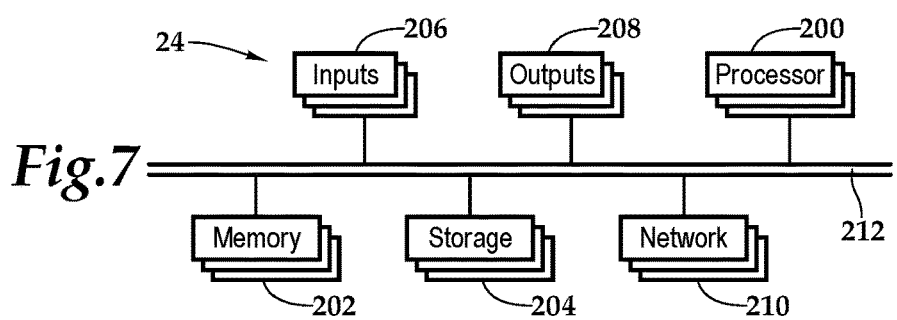
FIG. 7 is a functional block diagram depicting one embodiment of a server presented in FIG. 2B.

Referring now to FIG. 7, one embodiment of the server 24 as a computing device includes a processor 200, memory 202, storage 204, inputs 206, outputs 208, and network adaptors 210 interconnected with various buses 212 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 200 may process instructions for execution within the server 24, including instructions stored in the memory 202 or in storage 204. The memory 202 stores information within the computing device. In one implementation, the memory 202 is a volatile memory unit or units. In another implementation, the memory 202 is a non-volatile memory unit or units. The storage 204 includes capacity that is capable of providing mass storage for the server 24. Various inputs 206 and outputs 208 provide connections to and from the server 24, wherein the inputs 206 are the signals or data received by the server 24, and the outputs 208 are the signals or data sent from the server 24. The network adaptors 210 couple the server 24 to a network such that the server 24 may be part of a network of computers, a local area network (LAN), a wide area network (WAN), an intranet, a network of networks, or the Internet, for example. It should be appreciated that although a particular architecture is explained, other designs and layouts are within the teachings presented herein.

The memory 202 and storage 204 are accessible to the processor 200 and include processor-executable instructions that, when executed, cause the processor 200 to execute a series of operations. In one embodiment of processor-executable instructions, the processor-executable instructions cause the processor 200 to receive gateway signals from multiple gateway devices of the array, which may be the vertical and horizontal array or only a horizontal array. The processor 200 is caused to process the plurality of gateway signals and determine estimated location of the personal locator device 30. In another embodiment of processor-executable instructions, the processor-executable instructions cause the processor 200 to receive gateway signals from a wireless-enabled interactive programmable device acting as a gateway. The processor 200 is caused to process the gateway signals and determine estimated location of the personal locator device 30.

Figure 8:
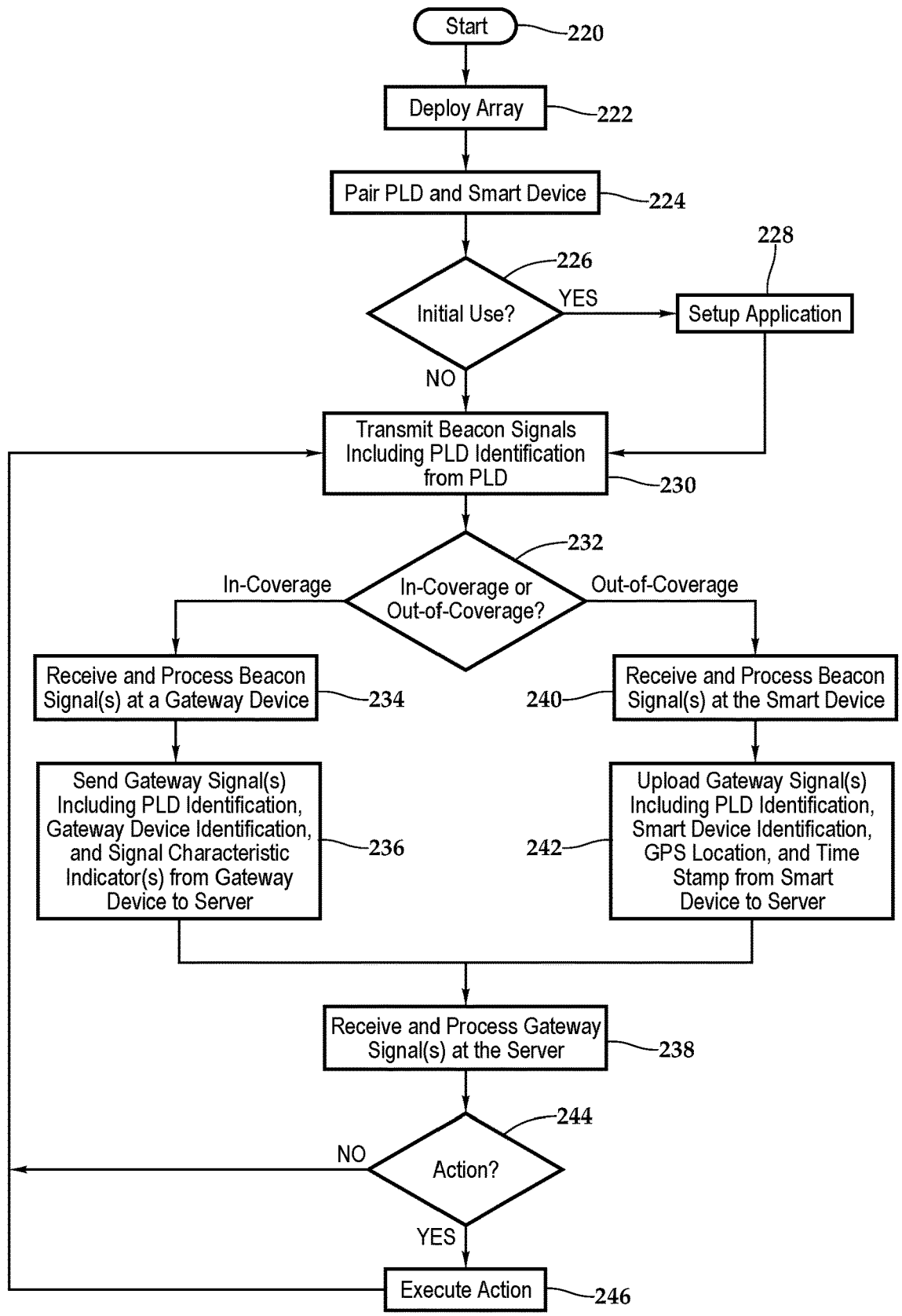
FIG. 8 is a flow chart depicting one embodiment of a method for providing a gateway device furnishing enhanced safety according to the teachings presented herein.

FIG. 8 depicts one embodiment of a method for providing safety in a hospitality environment or other environment, according to the teachings presented herein. At block 220, the methodology begins and advances to block 222, wherein the array of gateway devices is deployed vertically and horizontally throughout the hospitality environment. The array of gateway devices defines an area of coverage. At block 224, a personal locator device is paired with a proximate wireless-enabled interactive programmable device, such as a smart device. At decision block 226, if the pairing at block 224 is the initial pairing, then the methodology advances to block 228 where a gateway application running on the proximate wireless-enabled interactive programmable device is setup and configured. The method then advances to block 230. Similarly, at decision block 226, if the gateway application is already established on the wireless-enabled interactive programmable device then the methodology also advances to block 230.

At block 230, beacon signals are periodically transmitted from the personal locator device. At decision block 232, if the personal locator device is within an area of coverage then the process advances to block 234, where the beacon signals are received by the gateway devices which form part of the deployed array. Also, at block 234, the beacon signals are processed at the gateway device or gateway devices. The beacon signals may include a personal location device identification corresponding to the device being employed by the user. In one embodiment, a signal characteristic is measured. At block 236, gateway signals are sent from the gateway devices to the server that is part of the geolocation and safety network. The gateway signals may include the personal location device identification, gateway device identification, and signal characteristic indicators. At block 238, the server receives and processes the broadcast signals.

Returning to decision block 232, if the personal locator device is within an area of non-coverage then the process advances to block 240, where the beacon signals are received by the proximate wireless-enabled interactive programmable device with which the personal locator device is paired. Also, at block 240, the beacon signals are processed at the proximate wireless-enabled interactive programmable device. The beacon signals may include a personal location device identification corresponding to the device being employed by the user. Additionally, the proximate wireless-enabled interactive programmable device may append a proximate wireless-enabled interactive programmable device identification, GPS coordinates, and a timestamp. At block 242, gateway signals are sent from the proximate wireless-enabled interactive programmable device to the server that is part of the geolocation and safety network. At block 238, the server receives and processes the broadcast signals. At decision block 244, if no further action is required by the server, then the methodology returns to block 230. On the other hand, if action is required by the server, such as processing an alert signal and/or appropriate notifications, then the necessary action is executed at block 246 before the process returns to block 230.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A personal locator device comprising:
   a housing securing a processor and memory therein;
   a busing architecture communicatively interconnecting the processor and the memory;
   one or more wireless transceivers associated with the housing and coupled to the busing architecture, the one or more wireless transceivers configured to communicate with an array of gateway devices, the one or more wireless transceivers configured to communicate with a proximate wireless-enabled interactive programmable device;
   a first operational mode determining an estimated location of the personal locator device by communicating with a first server via the array of gateway devices, the array of gateway devices defining an area of coverage;
   a second operational mode determining the estimated location of the personal locator device by communicating with a second server via the proximate wireless-enabled interactive programmable device;
   the memory accessible to the processor, the memory including first processor-executable instructions for the first operational mode that, when executed, cause the processor to:
      transmit, in response to being in the area of coverage, a first beacon signal via the at least one or more wireless transceivers to the array of gateway devices, the first beacon signal including the personal locator device identification; and
   the memory including second processor-executable instructions for the second operational mode that, when executed, cause the processor to:
      transmit, in response to being out of the area of coverage, a second beacon signal, via the at least one or more wireless transceivers, to the proximate wireless-enabled interactive programmable device, the second beacon signal including the personal locator device identification.

2. The personal locator device as recited in claim 1, wherein the housing further comprises a portable electronic device.

3. The personal locator device as recited in claim 1, wherein the housing further comprises a single button personal locator device.

4. The personal locator device as recited in claim 1, wherein the housing further comprises a wearable.

5. The personal locator device as recited in claim 4, wherein the wearable further comprises an accessory selected from the group consisting of watches, bracelets, badges, pendants, and belt accessories.

6. The personal locator device as recited in claim 1, wherein the one or more wireless transceivers further comprise non-cellular wireless transceivers.

7. The personal locator device as recited in claim 1, wherein each of the one or more wireless transceiver is configured to communicate with a standard selected from the group consisting of infrared (IR), 802.11, 3G, 4G, Edge, Wi-Fi, ZigBee, near field communications (NFC), Bluetooth and Bluetooth low energy.

8. The personal locator device as recited in claim 1, wherein the proximate wireless-enabled interactive programmable device further comprises a device selected from the group consisting of smart watches, smart phones, and tablet computers.

9. The personal locator device as recited in claim 1, wherein the proximate wireless-enabled interactive programmable device further comprises a cellular-enabled device.

10. The personal locator device as recited in claim 1, wherein the first server and the second server are at least partially integrated.

11. The personal locator device as recited in claim 1, wherein the first server further comprises an onsite server in communication with the array of set-top boxes.

12. The personal locator device as recited in claim 1, wherein the second server is a cloud-based server.

13. The personal locator device as recited in claim 1, wherein each of the gateway devices further comprises a device selected from the group consisting of gateway service devices and set-top boxes.

14. The personal locator device as recited in claim 1, wherein the array of gateway devices is deployed in a multi-space environment.

15. The personal locator device as recited in claim 14, wherein the multi-space environment further comprises a hospitality environment.

16. The personal locator device as recited in claim 1, wherein the multi-space environment further comprises an educational environment.

17. A personal locator device comprising:
   a housing securing a processor and memory therein;
   a busing architecture communicatively interconnecting the processor and the memory;
   a button being secured within the housing, the button coupled to the busing architecture;
   one or more wireless transceivers associated with the housing and coupled to the busing architecture, the one or more wireless transceivers configured to communicate with an array of gateway devices, the one or more wireless transceivers configured to communicate with a proximate wireless-enabled interactive programmable device;
   a first operational mode determining an estimated location of the personal locator device by communicating with a first server via the array of gateway devices, the array of gateway devices defining an area of coverage;
   a second operational mode determining the estimated location of the personal locator device by communicating with a second server via the proximate wireless-enabled interactive programmable device;
   the memory accessible to the processor, the memory including first processor-executable instructions for the first operational mode that, when executed, cause the processor to:
      detect an actuation of the button,
      transmit, in response to being in the area of coverage, a first beacon signal via the at least one or more wireless transceivers to the array of gateway devices, the first beacon signal including the personal locator device identification and an alert notification; and the memory including second processor-executable instructions for the second operational mode that, when executed, cause the processor to:

detect an actuation of the button, and transmit, in response to being out of the area of coverage, a second beacon signal, via the at least one or more wireless transceivers, to the proximate wireless-enabled interactive programmable device, the second beacon signal including the personal locator device identification and the alert notification.

18. The personal locator device as recited in claim 17, wherein the housing further comprises a single button personal locator device.

19. A personal locator device comprising:

a housing securing a processor and memory therein;

a busing architecture communicatively interconnecting the processor and the memory;

one or more wireless transceivers associated with the housing and coupled to the busing architecture, the one or more wireless transceivers configured to communicate with an array of gateway devices, the one or more wireless transceivers configured to communicate with a proximate wireless-enabled interactive programmable device;

a first operational mode determining an estimated location of the personal locator device by communicating with a first server via the array of gateway devices, the array of gateway devices defining an area of coverage;

a second operational mode determining the estimated location of the personal locator device by communicating with a second server via the proximate wireless-enabled interactive programmable device;

the memory accessible to the processor, the memory including first processor-executable instructions for the first operational mode that, when executed, cause the processor to:

transmit, in response to being in the area of coverage, a first beacon signal via the at least one or more wireless transceivers to the array of gateway devices, the first beacon signal including the personal locator device identification;

the memory including second processor-executable instructions for the second operational mode that, when executed, cause the processor to:

transmit, in response to being out of the area of coverage, a second beacon signal via the at least one or more wireless transceivers to the proximate wireless-enabled interactive programmable device, the second beacon signal including the personal locator device identification; and an application installed on the proximate wireless-enabled interactive programmable device, the proximate wireless-enabled interactive programmable device including memory accessible to a processor, the memory including processor-executable instructions for the application that, when executed, cause the processor to:

receive the second beacon signal from the personal locator device, and transmit a gateway signal to the second server, the gateway signal including the personal locator device identification, a proximate wireless-enabled interactive programmable device identification, GPS coordinates, and a timestamp.

20. The personal locator device as recited in claim 19, wherein the proximate wireless-enabled interactive programmable device further comprises a device selected from the group consisting of smart watches, smart phones, and tablet computers.

* * * * *